April 7, 1936. J. T. LUSIGNAN, JR 2,036,225
LIGHTNING GUARD FOR TRANSMISSION LINES
Filed Aug. 28, 1931 2 Sheets-Sheet 1
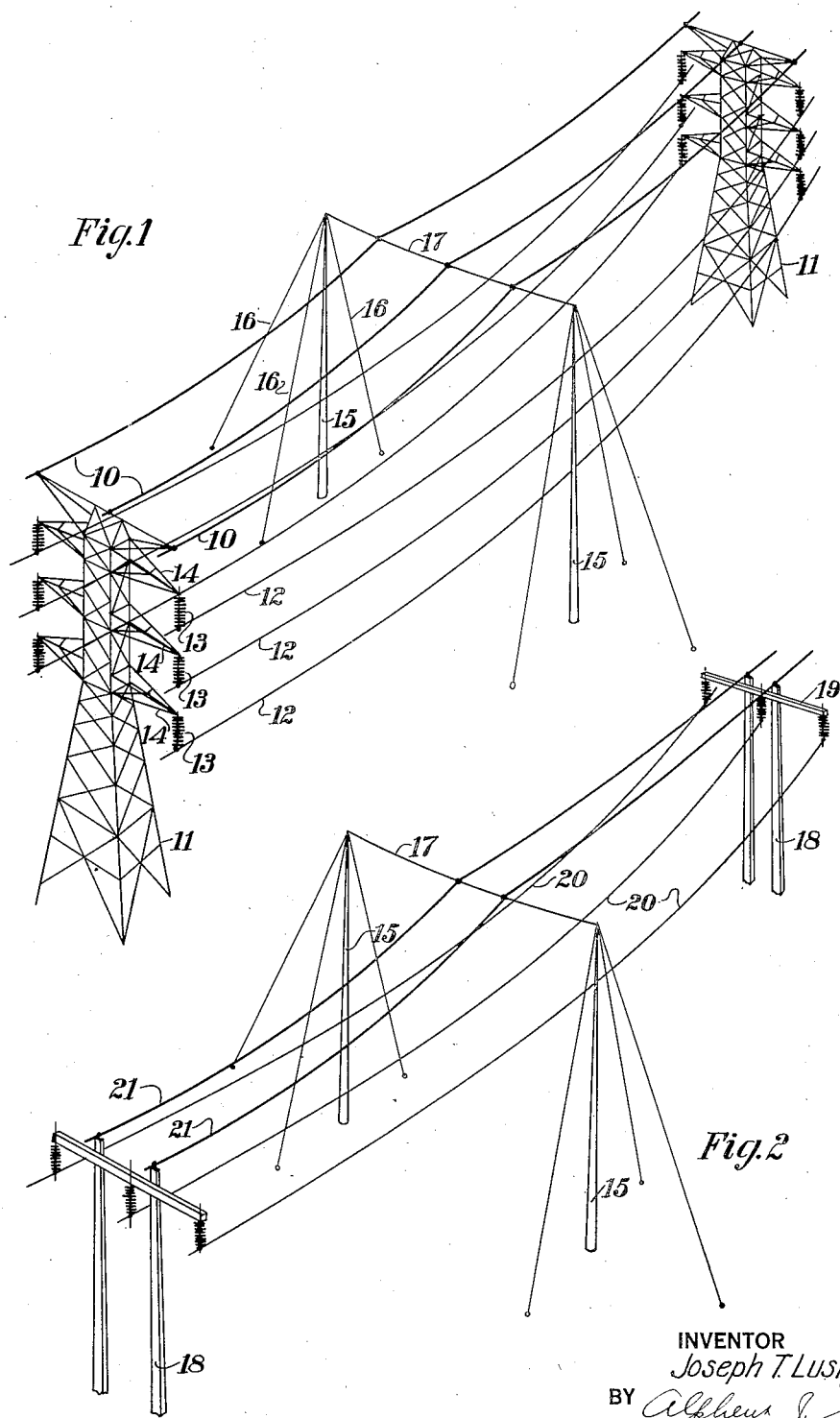
INVENTOR
Joseph T. Lusignan, Jr.
BY
ATTORNEY April 7, 1936. J. T. LUSIGNAN, JR 2,036,225
LIGHTNING GUARD FOR TRANSMISSION LINES
Filed Aug. 28, 1931 2 Sheets-Sheet 2

INVENTOR
Joseph T. Lusignan, Jr.
BY
ATTORNEY

Patented Apr. 7, 1936

2,036,225

UNITED STATES PATENT OFFICE 2,036,225

LIGHTNING GUARD FOR TRANSMISSION LINES

Joseph T. Lusignan, Jr., Mansfield, Ohio, assignor to The Ohio Brass Company, Mansfield, Ohio, a corporation of New Jersey Application August 28, 1931, Serial No. 559,877

10 Claims. (Cl. 175—30)

This invention relates to high potential transmission lines and has for one of its objects the provision of means for protecting such lines from direct lighting strokes.

A further object is to provide lightning protection for transmission lines which shall be of improved construction and operation.

Other objects and advantages will appear from the following description.

The invention is exemplified by the combination and arrangement of parts shown in the accompanying drawings and described in the following specification, and it is more particularly pointed out in the appended claims.

In the drawings:

Fig. 1 is a diagrammatic, perspective view of a portion of a transmission line having one embodiment of the present invention applied thereto.

Fig. 2 shows the application of the invention to a transmission line having wood supports.

Figure 3:
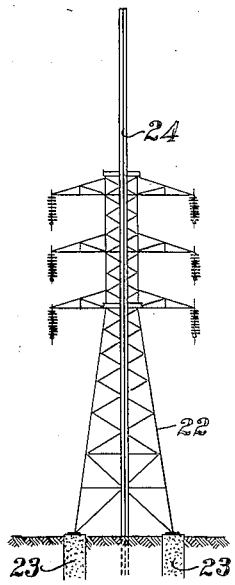
Fig. 3 is an elevation of a supporting structure having one feature of the invention applied thereto.

High potential transmission lines which traverse regions subject to lightning storms are liable to direct lightning strokes as well as abnormal voltages induced by lightning, and where a direct stroke occurs the voltage imposed upon the system is so great that flashover to ground commonly follows, causing damage and interruption of service. The present invention provides means for protecting the line from direct lightning strokes.

High tension transmission lines are commonly provided with one or more ground wires, shown at 10 in Fig. 1 of the drawings. These ground wires are commonly supported on the towers 11 near the tops of the towers, as shown in the drawings. The conductors 12 are suspended by insulators 13 from the cross arms 14. The arms may be mounted in any usual way on the supporting structures. Since the wires 10 are commonly at ground potential, it is necessary that they be kept clear of the transmission lines 12, and where spans are long there may be considerable difficulty in preventing the ground wires from approaching the transmission conductors near the centers of the spans. If the towers are made high enough to suspend the ground wires so that they will be clear of the transmission lines between the towers, the additional height is not only expensive but increases the liability of lightning interference. If the ground wires are stretched sufficiently tight to insure clearance of the ground wires from the transmission conductors between the towers, the additional tension increases liability to crystallization of the ground wires at their points of support, and adds to the stress in the wires so that danger of breaking is increased.

In the present invention, these difficulties are overcome by providing a supporting structure for the ground wires 10, located between the towers 11. This supporting structure may be of simple arrangement and the form shown in the drawings comprises single uprights 15 at each side of the line, provided with the necessary guys 16 to hold them in place. A cable 17 or other suitable support extends above the transmission line conductors from one side to the other and holds the ground wires 10 at an elevated position between the towers. This insures clearance between the transmission lines and ground wires and provides means which effectively protects the transmission line from direct lightning strokes. Where the support is well grounded, it also provides a low resistance to ground for conducting the charge from a direct stroke to the earth, so that little voltage will be built up between the ground wire and conductors should a direct stroke occur. If the uprights 15 are connected by a rigid cross brace instead of the flexible cable 17, it may not be necessary to use guy wires for the upright, in which case a narrower right-of-way can be used than would be necessary if outwardly extending guys are used.

If lightning should strike a ground wire between the towers that was grounded at the towers only, the resistance of the ground wire between the point struck and the tower would tend to cause considerable voltage to be built up between the ground wire and conductors which might cause arcing between these wires.

The supports 15 will, of course, have to be located so that they will not interfere with the transmission lines and so that the transmission lines will not swing too near to the supports. However, since the supports 15 are grounded, they may be located at or near the edge of the right-of-way without danger. Instead of the guide poles 15, fabricated poles or masts may of course be used.

Fig. 2 shows the invention applied to wood supporting structures 18 having wood cross arms 19 for supporting the conductor lines 20. The ground wires 21 are supported between the structures 18 by an intermediate support 17 which may be arranged the same as that shown in Fig. 1. The invention has especial advantage in connection with wood supports or steel supports having wood arms for the reason that it provides a ground connection for the ground wires independent of the transmission line supports, and removes the necessity of the ground at the supports 18, thus making it possible to secure full advantage of the insulating properties of the supports 18.

Where a supporting structure is insulated or partially insulated from ground, it may be desirable to protect the supporting structure from lightning strokes as well as the transmission line.

Figure 4:
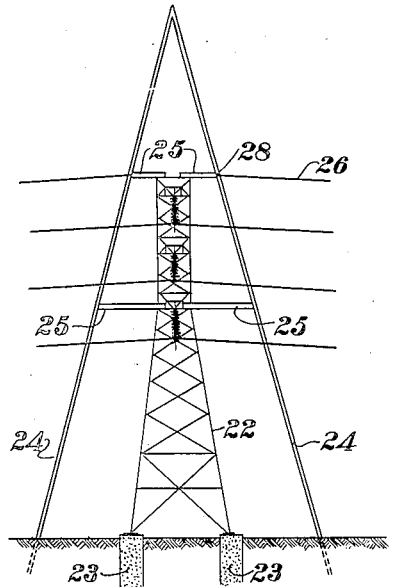
Fig. 4 is an elevation of the structure shown in Fig. 3 but looking transverse to the transmission line.

In the form of the invention shown in Figs. 3 and 4, means is provided for guarding the towers 22 from direct strokes of lightning. The towers 22 are shown as mounted on concrete or rock bases 23 which provide considerable insulation so that if the towers are struck by lightning, a sufficient voltage may be built up on the towers to cause flashover to the transmission lines. In this case, protection from direct stroke is provided by guard members 24 which are grounded at their bases and extend above the tower so that in case of a lightning stroke, the lightning will strike the guard members 24 and be conducted to ground without interfering with the tower or transmission line. These guards 24 will also protect the line for a considerable distance at each side of the tower and, in some cases, may be adequate to protect the entire line from direct strokes. The members 24 may be connected together at the top in any suitable way, either directly or by cross bars if desired. Where the members are braced from the towers 22, wood beams 25 or other insulating material or braces may be employed for this purpose. The guards 24 must, of course, be so located that there is no danger of a transmission line swinging into the guards, but this may usually be done by placing the guards between the lines as illustrated in the drawings.

Figure 5:
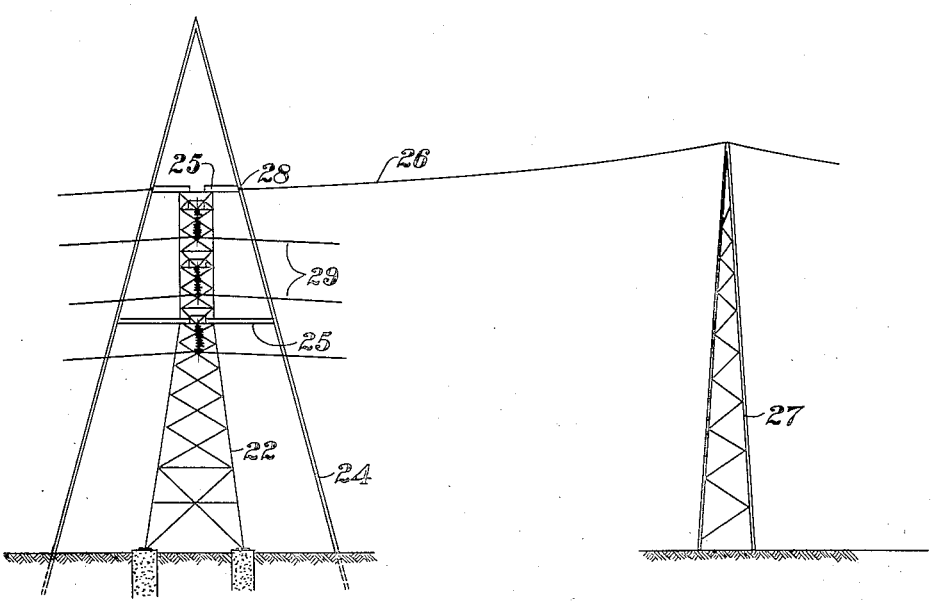
Fig. 5 is an elevation of a portion of the transmission line having features of the invention shown in Figs. 1, 3 and 4 applied thereto.

In Fig. 5 the towers are provided with guards 24 and the ground wire or wires 26 are provided with an intermediate ground wire support 27 which elevates the ground wires between the towers in the manner shown in Figs. 1 and 2. The ground wires 26 are preferably attached to the guards 24, as shown at 28, so that these wires are grounded at the towers independently of the tower structures. With the arrangement shown in Fig. 5, lightning protection is provided not only at the towers but also between the towers, so that the transmission lines 29 are fully protected against direct stroke throughout the entire line.

Modified arrangements of the invention will no doubt suggest themselves to those skilled in the art, and I do not wish therefore to restrict the invention to the exact forms shown in the drawings except as pointed out in the appended claims.

I claim:

1. The combination with a transmission line conductor, of a support for said conductor, a grounded lightning guard disposed adjacent said support and extending above said support and conductor, a ground wire connected to said lightning guard and extending along said conductor but spaced therefrom, and a grounded support for said ground wire arranged to carry said ground wire at a greater elevation above said conductor at a point spaced from said support and lightning guard than adjacent said support and lightning guard.

2. A transmission line comprising a support, horizontally spaced conductors carried by said support, a lightning guard for said support and conductors comprising legs disposed between said conductors and spaced from each other, one at each side of said support and extending above said conductors and support, and insulating braces connecting said legs and support, said guard being grounded.

3. The combination with an electrical transmission line, of a lightning guard for said line comprising a guard conductor extending adjacent said line and disposed above the same to protect said line from direct strokes of lightning, different portions of said guard conductor being supported at different elevations and spaced at different distances from said transmission line, points of maximum elevation of said guard conductor and of maximum spacing from said transmission line coinciding so that said guard conductor will be spaced from said transmission line maximum amounts at points of greatest elevation and consequently greatest liability to lightning strokes.

4. The combination with an electrical transmission line, of a lightning guard for said line comprising a guard conductor extending adjacent said line and at a greater elevation than said line, said guard conductor being supported at different elevations along the length thereof and at different distances above said transmission line, points of maximum elevation of said guard conductor coinciding with points of maximum spacing from said transmission line to provide maximum spacing between said conductor and line at points of greatest liability to lightning strokes, said guard conductor being grounded at said points of maximum elevation to minimize the danger of discharge between said guard conductor and transmission line at its points of greatest liability to lightning strokes.

5. The combination with an electrical transmission line, of spaced supports for said line and a lightning guard for said line, said lightning guard comprising a guard conductor mounted above said transmission line and extending adjacent said transmission line and supplemental supports holding said guard conductor at a greater elevation at one point between each pair of transmission line supports than at other points, and providing maximum elevation of said guard conductor at points of maximum separation thereof from said transmission line to provide maximum separation between said guard conductor and transmission line at points of greatest liability of said guard conductor to lightning strokes, said guard conductor being grounded by said supplemental supports at its points of maximum elevation.

6. The combination with a transmission line, of spaced supports for said line and a lightning guard for said line comprising a guard conductor extending along said transmission line, and means for preventing discharge from said guard conductor to said line in case of a lightning stroke at a point between said supports, said means comprising a supplemental support between said transmission line supports, one point on said guard conductor being held by said supplemental support at a maximum elevation and at a maximum distance from said line, said guard conductor being grounded by said supplemental support at its point of maximum elevation and maximum separation from said line to increase the liability for lightning to strike at that point rather than at adjacent points and to decrease the liability of damage by a lightning stroke at that point.

7. The combination with a transmission line, of spaced supports for said line and a lightning guard for said line comprising grounded members extending above said line adjacent said spaced supports, a guard conductor disposed above said line between said spaced supports, and a supplemental support holding said guard conductor at a maximum elevation above said line at a point between said spaced supports to intercept lightning strokes between said spaced supports, said guard conductor being grounded by said supplemental support at its point of maximum elevation to decrease the danger of flashover between said guard conductor and transmission line at the point of greatest elevation of said guard conductor.

8. A transmission line comprising spaced supports, a transmission line carried by said supports and a lighting guard for said transmission line and spaced supports, said lightning guard comprising a grounded structure spanning each of said spaced supports and extending above said spaced supports and insulated from said spaced supports, and a guard conductor extending adjacent said transmission line and carried by said grounded structures and insulated from said transmission line and spaced supports, and supplemental supports disposed between said spaced supports and holding said guard conductor at maximum elevation above said transmission line at points intermediate said spaced supports, said guard conductor being grounded at said points by said supplemental supports.

9. A transmission line conductor, spaced supports for said conductor, a ground wire carried by said supports above said conductor, and intermediate means between said supports holding said ground wire at an elevation above said conductor greater than that at which it is held at said supports, said ground wire being grounded by said intermediate means.

10. A transmission line conductor, spaced supports for said conductor, a ground wire above said conductor and extending in the direction thereof, and means for supporting said ground wire at a point between said supports, said ground wire being held by said means at a higher elevation between said supports than it is at said supports and being grounded between said supports adjacent its point of maximum elevation.

JOSEPH T. LUSIGNAN, Jr.